United States Patent Office 3,278,531
Patented Oct. 11, 1966

3,278,531
NOVEL NUCLEOPHILE DERIVATIVES OF CEPHALOSPORIN C AND ALLIED COMPOUNDS AND THEIR PROCESS OF MANUFACTURE
James Stuart Gordon Cox, Radcliffe-on-Trent, and Harry Fazakerley and John Derek Cocker, Chalfont St. Peter, England, assignors to Glaxo Laboratories Limited, Greenford, England, a British company
No Drawing. Filed May 7, 1962, Ser. No. 193,015
Claims priority, application Great Britain, May 16, 1961, 17,845/61; Jan. 26, 1962, 3,026/62
18 Claims. (Cl. 260—243)

This invention relates to the production of novel derivatives of cephalosporin C and allied compounds.

The constitution of cephalosporin C has been interpreted in terms of the following structure:

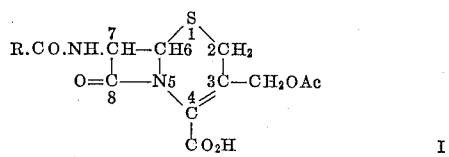

where $R=-(CH_2)_3.CH(NH_2)COOH$ and consequently the structure of the novel derivatives described below is presented in an analogous fashion.

It has now been found that cephalosporin C and allied compounds will react with certain compounds of a highly nucleophilic nature as hereinafter defined by displacement of the acyloxy group from the cephalosporin molecule to form novel derivatives thereof. Many of these derivatives have antibacterial activity which, in some instances, is superior to that of the parent cephalosporin.

The compounds according to the invention have in general the important advantage of improved stability to degradation in vivo (as evidenced, for example, by animal tests) compared with the corresponding acetoxy compounds. Since the latter possess activity against penicillin resistant organisms that is highly important. The compounds according to the invention are also of interest as intermediates for conversion to other cephalosporin derivatives.

According to the invention, therefore, there is provided a process for the production of derivatives of cephalosporin C which comprises reacting in a polar medium a compound of the general formula:

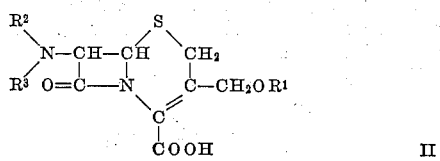

(in which $R^1$ is an acyl group, particularly a lower alkanoyl group, and $R^2$ and $R^3$ are each hydrogen atoms or $R_2$ is a hydrogen atom and $R_3$ is an acyl group or a triaryl substituted alkyl group, e.g., a triphenyl methyl group or $R^2$ and $R^3$ together form a divalent acyl group derived from a dicarboxylic acid) or a salt thereof, with a strong nucleophile selected from:

(a) Thiourea and substituted thioureas including aliphatic, aromatic, alicyclic and heterocyclic substituted thioureas;

(b) Aromatic and aliphatic thioamides, e.g., thioacetamide and thiosemicarbazide;

(c) Thiophenol and substituted thiophenols;

(d) Substituted and unsubstituted primary and secondary aromatic amines, preferably free from tertiary nitrogen heterocyclic substituents;

(e) Thiols and substituted thiols, particularly amino thiols and substituted aminothiols;

(f) Metal salts, particularly alkali metal salts, of azide ion $(N_3-)$ hydrogen phosphate ion $(HPO_4=)$ and thiosulphate ion $(S_2O_3=)$ (g) Pyrroles and substituted pyrroles, e.g., alkylpyrroles.

Since the group $R^3$ may be the group

$HOOC.CH(NH_2).(CH_2)_3.CO$ and the group $R^1$ may be an acetyl group it will be appreciated that general Formula II includes cephalosporin C as well as derivatives thereof.

Whilst $R^3$ may represent an acyl group in general terms one may use other specific acyl derivatives representative of alkanoyl, alkenoyl, substituted alkanoyl, e.g., aralkanoyl, aryloxyalkanoyl, S-arylthioalkanoyl and S-aralkylthioalkanoyl, of cephalosporin derivatives of nucleophiles as defined herein. These acyl derivatives may be defined as having the general formulae:

(i) $R'(CH_2)_nCO$— where $R'$ is aryl, cycloalkyl, substituted aryl or substituted cycloalkyl and $n$ is an integer from 1–4. Examples of this group include phenylacetyl, nitrophenylacetyl and phenylpropionyl.

(ii) $C_nH_{2n+1}CO$— where $n$ is an integer from 2–7. The alkyl group may be straight or branched and, if desired, may be interrupted by an oxygen or a sulphur atom. Examples of such groups include hexanoyl, heptanoyl, octanoyl and butylthioacetyl.

(iii) $C_nH_{2n-1}CO$— where $n$ is an integer from 2–7. The alkenyl group may be straight or branched and, if desired, may be interrupted by an oxygen or a sulphur atom. Examples of such groups include acrylyl, crotonyl and allythioacetyl.

(iv) $R'OCR''R'''.CO$— where $R'$ has the meaning defined under (i) and $R''$ and $R'''$ are the same or are different and each is a hydrogen atom or an alkyl group. An example of such a group is phenoxyacetyl.

(v) $R'SCR''R'''.CO$— where $R'$, $R''$ and $R'''$ are as defined above. Examples of such thio groups include S-phenylthioacetyl, S-chlorophenylthioacetyl and S-bromophenylthioacetyl.

(vi) $R'(CH_2)_mS(CH_2)_nCR''R'''.CO$— where $R'$, $R''$ and $R'''$ are as defined above, $m$ is an integer from 1–4 and $n$ is 0 or an integer from 1–4. Example of such a group include S-benzylthioacetyl, benzylthiopropionyl and β-phenethylthioacetyl.

(vii) $R'CO$— where $R'$ has the meaning defined above. Examples of such groups include benzoyl, substituted benzoyl and cyclopentanoyl. Where the benzoyl group is substituted the substituents may be alkyl or alkoxy and the substituents may be in the 2- or 2- and 6-positions. A suitable 2,6-disubstituted benzoyl group is therefore 2,6-dimethoxy-benzoyl.

The reaction may conveniently be effected by incubating the reactants in solution; that is, maintaining the reactants in solution at a moderate temperature, such as, for example, 15–70° C., preferably 37–50° C., for a period of some hours or even days until the desired derivative is obtained in optimum yield. The reaction proceeds particularly well when carried out at a temperature of about 37° C. for a period of from 48 to 72 hours. The reactants are advantageously employed in a ratio of about 1 molar equivalent of the compound of general Formula II to 1–10 molar equivalents of nucleophile. The pH value of the reaction solution is advantageously maintained within the limits 5.0–8, preferably 6–7. If necessary the pH of the solution should be adjusted to the desired value by the addition of a buffering agent such as sodium acetate or, when employing an alkali metal salt of the cephalosporin of general Formula II, by the addition of, for example, acetic acid.

Since the reaction appears to proceed by a polar or ionic mechanism it is necessary to employ a strongly polar medium for the reaction to proceed at a measurable rate. The most generally suitable solvent is water but in those cases in which the nucleophile is not very soluble in water a mixture of water and a water miscible organic solvent such as dimethylformamide, acetone or ethanol may be employed; suitable proportions for such solvent mixtures are 50:50 (v./v.)—or 30:70 (v./v.). Nonaqueous polar solvents such as acetone may also be used.

The reaction product may be separated from the reaction mixture, which may contain, for example, unchanged cephalosporin and other substances, by a variety of processes including crystallisation, ionophoresis, paper chromatography or by chromatography on ion-exchange resins.

If desired in some cases the compound obtained may then be incubated with a further nucleophile to effect displacement of the first nucleophile. This may be advantageous with certain nucleophiles.

Preferred cephalosporin compounds of general Formula II include cephalosporin C and its benzyl analogue ($R^3$=phenylacetyl), especially in the form of their alkali metal salts, for example the sodium salt. However as will be apparent from the examples below other such analogues have given rise to compounds having advantageous activity.

Suitable nucleophiles of group (a), the thioureas, include members of the general formula

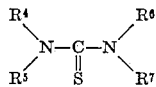

(in which $R^4$, $R^5$, $R^6$ and $R^7$ may be same or different and each represents a hydrogen atom or an alkyl, cycloalkyl, alkenyl, aryl, aralkyl group, or a substituted group of any of these types, or $R^4$ and $R^6$ together represent an alkylene group, e.g., an ethylene group). Examples of such thioureas includes thiourea itself, N-phenylthiourea, N,N'-diphenylthiourea and ethylene thiourea.

The substituted and unsubstituted primary and secondary amines (d) may be exemplified by aniline, p-nitro aniline, p-nitro-N-methyl aniline, sulphanilic acid and p-amino benzoic acid; the group also covers the naphthylamines such as α-naphthylamine and substituted naphthylamines.

It is particularly preferred to use substituted thiols including aminothiols and substituted aminothiols as nucleophiles of group (e). Examples of such nucleophiles include 2-aminoethanethiol, 2-amino-2-methyl-propane-1-thiol, 3-dimethylaminopropane-1-thiol and 2-piperidinoethane-1-thiol.

The anions employed as nucleophile in the form of their metal salts are preferably in the form of their alkali metal salts, e.g., sodium salts.

As previously mentioned the derivatives produced by the process according to the invention are new. The new compounds may be divided into the following general classes corresponding to the classes of nucleophiles set out above:

(a) Those having the general formula—

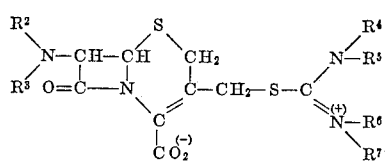

(in which $R^2$, $R^3$, $R^4$, $R^5$, $R^6$ and $R^7$ have the meanings defined above).

(b) Those having the general formula—

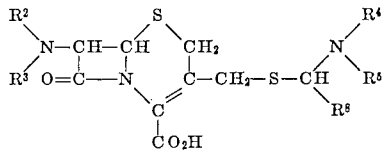

(in which $R^2$, $R^3$, $R^4$ and $R^5$ have the meanings defined above and $R^8$ represents an aliphatic or aromatic radical);

(c) Those having the formula—

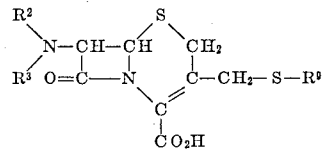

(in which $R^2$ and $R^3$ have the meanings defined above and $R^9$ is an aromatic or substituted aromatic radical) and their alkali metal salts.

This sub-class includes compounds derived from thiophenols substituted in the nucleus with an amino or substituted amino group, e.g., alkylamino or dialkylamino. Simple examples of thus thiophenols are therefore o- and p-amino-thiophenol. It also includes compounds derived from thiophenols containing a conjugated electron attracting group, i.e., such a group in an o- or p-position or, if desired, in more than one such position. Important examples of this type of nucleophile are various nitrothiophenols, e.g., o-nitrothiophenol and o,p-dinitro-thiophenol.

The term "electron attracting group" is, of course, well-known in organic chemistry and refers to a substituent which attracts electrons more than hydrogen does (see for example A. M. Remick "Electronic Interpretations of Organic Chemistry," John Wiley & Sons Inc., New York, 1943).

Examples of electron attracting groups which may be present on the nucleophiles used in the process according to the invention are nitro groups, nitroso groups, carbonyl groups, carboxyl groups, cyano groups and trifluoromethyl groups.

(d) Those having the general formula—

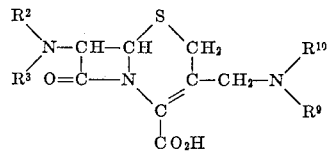

(in which $R^2$, $R^3$ and $R^9$ have the meanings defined above and $R^{10}$ represent a hydrogen atom or an alkyl group) and their alkali metal salts;

(e) (i) Those having the general formula—

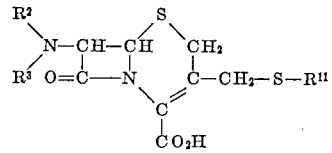

(in which $R^2$ and $R^3$ have the meanings defined above and $R^{11}$ represents an aliphatic or, preferably, substituted aliphatic group) and their alkali metal salts;

(ii) Those having the general formula—

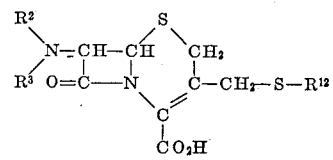

(where $R^{12}$ is a heterocyclic ring) and salts thereof. Important members of the sub-class are compounds derived from heterocyclic compounds containing appropriate substituents and which are 5- or 6-membered rings and heterocyclic compounds of this type fused to a 6-membered carbocyclic ring, e.g., a benzene ring. Hetero atoms which may be present in the ring include nitrogen, sulphur and oxygen at least one of which must be nitrogen. Usually, the mercapto group will be attached to a carbon atom of the heterocycle and a heterocyclic nitrogen atom will be adjacent to this carbon atom. The heterocycle may contain other substituents, e.g., N-alkyl, ketonic oxygen, etc. The sub-class therefore includes derivatives of thiazoline, hydantoin, imidazole, thiazole, oxazole, etc., but it should be understood that it does not include cyclic thioureas.

Examples of heterocyclic nucleophiles which may be used thus include 2-mercaptothiazoline,
2-mercaptohydantoin,
1-methyl-2-mercapto-imidazole,
2-mercaptoimidazole,
2-mercapto-benzimidazole,
2-mercapto-benzothiazole,
2-mercapto-benzoxazole, and
2-mercapto-pyridine.

Examples of the group $R^{12}$ thus include:

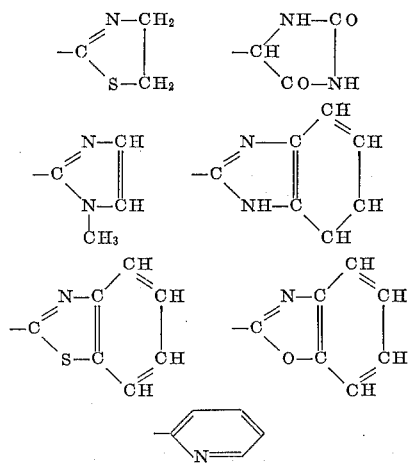

It should be understood that although these heterocyclic compounds are described as thiol (mercapto) or thione compounds they may exist as thione, mercapto zwitterion tautomers and the invention is to be considered as also applying to such tautomeric forms. It will be appreciated that the heterocyclic compounds are described as mercapto or thione compounds for reasons of convention.

(f) Those having the general formula—

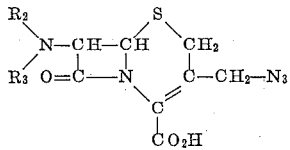

VIII (in which $R^2$ and $R^3$ have the meanings defined above) and their alkali metal salts. Compounds of this type have in general advantageous solubility characteristics in aqueous media and possess improved in vitro activity against gram positive organisms as compared with the parent cephalosporin when the latter is active.

(g) Those having the general formula—

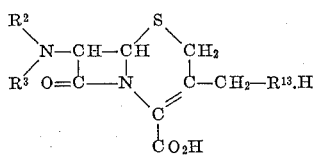

IX (in which $R^2$ and $R^3$ have the meanings defined above and $R^{13}$ represents the group —$S_2O_3$ or —$HPO_4$) and their alkali metal salts.

(h) Those having the general formula—

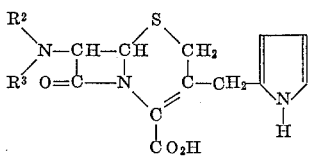

X (in which $R^2$ and $R^3$ have the meanings defined above) and derivatives thereof substituted in the pyrrole ring, and their alkali metal salts.

The compounds described above will in general have antibacterial activity when at least one acyl group is present on the amine group in the 7-position and some of such compounds show a superior antibacterial activity against certain organisms than does the parent cephalosporin derivative itself. Compounds which are of particular importance are the thiouronium, substituted thiouronium and azide derivatives. Compounds in which the 7-position is occupied by an unsubstituted amino group are particularly useful as intermediates for the preparation of cephalosporin analogues.

Thus, a compound produced according to the invention which is of particular importance is the thiouronium derivative of benzylcephalosporin which may be represented by the formula:

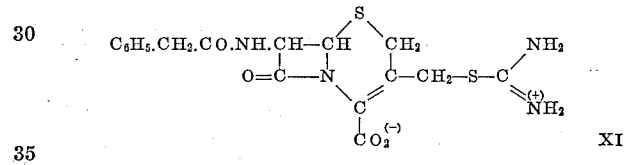

XI

The ultraviolet spectrum of this compound showed $\lambda_{max.}^{H_2O}$ 2600 A., $E_{1\ cm.}^{1\%}$ 189

It showed marked biological activity against *Staph. aureus*, and *B. subtilis*. The activity of this derivative against *Staph. aureus* was found to be superior to that of the parent cephalosporin C, benzyl cephalosporin and cephalosporin C thiouronium salt. Not only was it found to have significant activity against penicillin sensitive strains of *Staph. aureus* but it was also found to have marked activity against important strains of penicillin resistant *Staph. aureus*. Moreover, it was found to be highly resistant to staphylococcal penicillinase as are of course cephalosporin C and benzylcephalosporin. Another compound which is also important is the thiouronium salt of cephalosporin C itself which was found to be more active against *Staph. aureus* and *B. subtilis* than cephalosporin C.

Other important compounds according to the invention having somewhat similar activity to the compound of Formula XI include:

(1) 7-benzylthioacetamidocephalosporin thiouronium salt

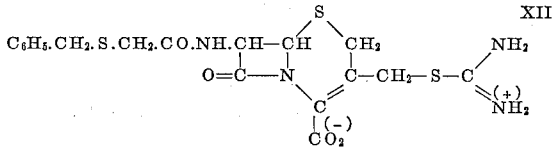

XII (2) 7 - allylthioacetamidocephalosporin thiouronium salt

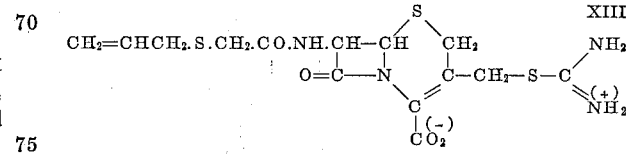

XIII (3) 7-β-benzylthiopropionamidocephalosporin thiouronium salt

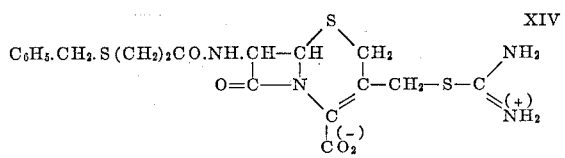
XIV (4) 7-β-phenylpropionamidocephalosporin thiouronium salt

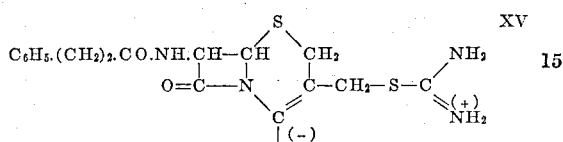
XV (5) 7-pentanecarboxamidocephalosporin thiouronium salt

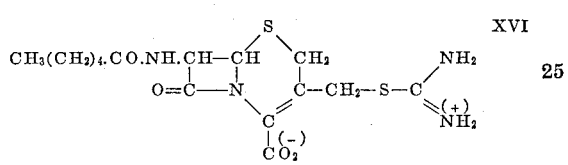
XVI (6) 7-n-butylthioacetamidocephalosporin thiouronium salt

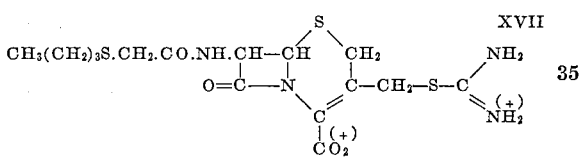
XVII (7) 7-p-chlorophenylthioacetamidocephalosporin thiouronium salt

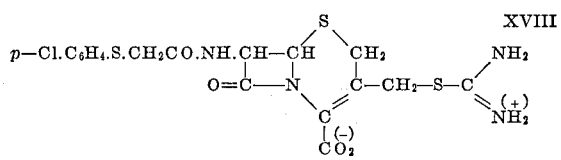
XVIII (8) 7-β-phenethylthioacetamidocephalosporin thiouronium salt

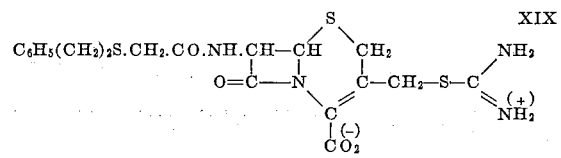
XIX (9) 7-phenylacetamidocephalosporin azide

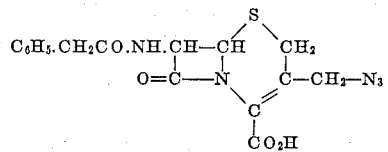
XX

(10) 7-benzylthioacetamidocephalosporin azide

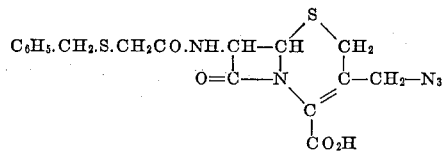
XXI

(11) 7-phenylacetamidocephalosporin - mercaptopyridine derivative

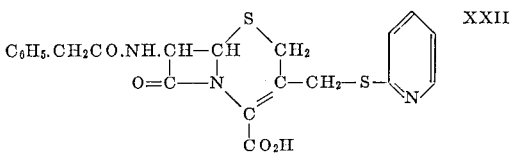
XXII

(12) 7-phenylacetamidocephalosporin N-ethyl thiouronium salt

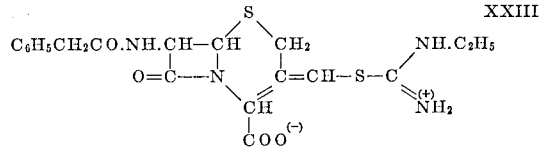
XXIII

(13) 7-phenylacetamidocephalosporin - mercaptobenzoxazole derivative

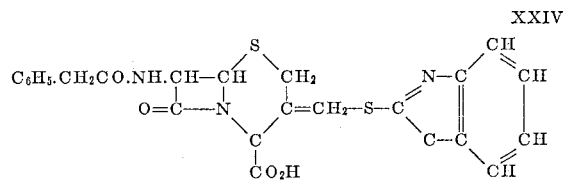
XXIV

The compounds obtained according to the invention, may be hydrolysed, particularly those directly obtained from cephalosporin C to produce the corresponding 7-amino cephalosporanic acid derivatives, i.e., having the formula

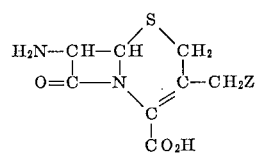

(in which Z is the residue of a strong nucleophile as defined above). These derivatives are important intermediates in the production of acyl derivatives thereof, e.g., phenylacetyl derivatives.

The compounds prepared according to the present invention may be formulated for administration in any convenient way by analogy with other antibiotic substances.

The compounds may thus be made up into injectable preparations in solution or suspension in a suitable media, e.g., sterile, pyrogen-free water. Alternatively, they may be mixed with solid excipients and then, if desired, compressed into tablets or filled into capsules. They may also be mixed with suitable bases for presentation as suppositories.

Some of the compounds according to the invention are of low solubility and it has been found that the solubility of such compounds can be improved by the use of a physiologically acceptable water soluble amide as solubility promoter.

The water-soluble amide used in accordance with the invention must be physiologically acceptable and thus provoke no undue toxic effects in the proportions used. It is preferred to employ urea or nicotinamide since these substances are physiological substances and in the case of urea the body is provided with an efficient eliminatory mechanism for it whilst nicotinamide is a member of the B complex of vitamins. However, various other water-soluble amides, such as acetamide may also be used which do not provoke any undue toxic effects. It will be appreciated that the administration of a water-soluble amide, particularly by the parenteral route, may give rise to some minor side effects, such as a reduction in blood pressure, but such minor side effects can be tolerated in many cases. In general preference is given to the use of such amides as are solids at 20° C.

Whilst the compositions according to the invention can be formulated for both oral and parenteral administration, they are particularly of value for the formulation of injectable preparations for intramuscular or subcutaneous injections. The preparations can also be formulated as dry mixtures of the antibiotic material together with the amide, which mixtures are adapted to be dissolved or dispersed in pyrogen-free water prior to injection. The preparations may also be formulated for oral administration including, if desired, further excipients, e.g., flavouring and sweetening agents.

Solutions and suspensions of the active substances according to the invention may also contain further solubilising substances, particularly physiologically acceptable water-miscible organic solvents for the active material, e.g., alcohol, propylene glycol, dimethylformamide, dimethylacetamide, etc. It will be appreciated that some of these substances are not suitable for parenteral administration whilst being suitable for oral administration and vice versa.

The proportion of amide to antibiotic in the compositions according to the invention varies according to the concentration of the solution which it is desired to achieve. Where it is desired to dissolve the antibiotic in an aqueous solution already containing the amide, it is generally preferable that the solution should be saturated (or nearly saturated) with respect to the amide, as the greater the proportion of amide in the solution, the greater is the solubility of the antibiotic therein. The amount of amide required depends both on the particular amide and antibiotic used but, in general terms, the amide should be present in an amount of at least twice and preferably 10–20 times the total amount (by weight) of antibiotic present, the solubility of antibiotic generally increasing with increasing proportions of amide.

The compounds according to the invention may be administered in combination with other antibacterial antibiotics especially the penicillins such as penicillin G and/or the tetracyclines.

In order that the invention may be well understood the following examples are given by way of illustration only. In the examples the following testing and experimental procedure was followed.

PAPER CHROMATOGRAPHY

*Phosphate buffered papers.*—Anhydrous disodium hydrogen phosphate (7.05 g.) in water (2.5 litres; 0.02 M) was adjusted to pH 6 with phosphoric acid; Whatman No. 1 papers (30 x 50 cm.) were dipped into the above solution and dried at 37° overnight.

*Sodium acetate buffered papers.*—Hydrated sodium acetate 13.6 g. in water (1 litre; 0.1 M) was adjusted to pH 5 with acetic acid; Whatman No. 1 papers (30 x 30 cm.) were dipped into the above solution and dried.

Paper chromatograms were run on phosphate-buffered paper in (A) butan-1-ol-ethanol-water (4:1:5; by volume) and (B) Propan-1-ol-water (7:3 by volume) also on sodium acetate buffered papers in ethyl acetate-sodium acetate solvent system (ethyl acetate saturated with sodium acetate buffer pH 5.0).

*Electrophoresis.*—Electrophoresis was carried out on Whatman 3MM paper at 17 v./cm. (for 2.5–4 hours, unless stated otherwise) in aqueous collidine acetate solution (0.05 M to acetate) pH 7.0 and pyridine acetate solution (0.05 M to acetate) pH 4.0.

Electrophoresis results are expressed as distance travelled by derivative relative to that travelled by Cephalosporin C (or benzylcephalosporin C as the case may be) under the same conditions. A positive (+) value implies migration towards anode, i.e., molecule is negatively charged whereas a negative (−) value indicates migration towards cathode, i.e., positively charged.

Members of the benzyl cephalosporin family were seen as dark spots when the paper was placed before a source of ultra-violet light ($\lambda$230–300 m$\mu$) ("benzylcephalosporin" derivatives do not of course give any coloration with ninhydrin.) They were also detected by means of bioautographs on agar plates inoculated with *S. aureus* C864 (Oxford H strain), *B. subtilis* ATCC 6633 or *V. cholerae* C833 (attenuated laboratory strain).

Members of the cephalosporin C family were seen as dark spots when the paper was placed before a source of ultra-violet light (230–300 m$\mu$) and appeared as purple spots when the paper was sprayed with ninhydrin. They were also detected by means of bioautographs on agar plates inoculated with either *S. aureus* C864 (Oxford H strain) or *B subtilis* ATCC 6633.

*Example 1*

(a) *Preparation thiouronium salt of cephalosporin C.*—Cephalosporin C (Na salt; 5 g.) together with thiourea (8 g.) were dissolved in distilled water (200 cc.) and allowed to stand in the absence of light at 37° C. for several days. Paper chromatography was used to follow the extent of the reaction. After 4–5 days examination by this technique showed that there was little cephalosporin C remaining. The resulting solution was treated with acetone (1000 cc.) and cooled to 0° C. The oily precipitate which had formed was separated by centrifugation and on further manipulation with acetone gave a pale brown solid (3.7 g.). Under the same conditions a solution of thiourea (concn. 4 g./1000 cc.) remained quite clear. The pale brown solid, which contained all the biologically active material, was dissolved in water (50 cc.) and passed through a column (26.0 x 2.5 cm.) of Dowex-1 (x 8) in the acetate cycle. The thiouronium salt was eluted rapidly from the column appearing almost at the solvent front. The column was eluted with water and fractions (25 cc.) was collected.

Examination of these fractions by paper chromatography showed only trace amounts of thiourea were present in the solutions of the thiouronium salt, all the unreacted cephalosporin C had been removed. The aqueous solutions containing the thiouronium compound were freeze dried to give a cream solid (2.58 g.). This material was further purified by extraction with absolute methanol (to remove the sodium acetate present) and the thiouronium compound was obtained as a fluffy solid (2.18 g.). Ultra-violet absorption (in $H_2O$)

$\lambda$ max. v. broad 2590–2640 A. $E_{1\ cm.}^{1\%}$ 161

The thiouronium salt was obtained as a white microcrystalline solid by careful precipitation from aqueous solution by methanol. Ultra-violet absorption (in $H_2O$)

$\lambda$ max. v. broad 2590–2640 A. $E_{1\ cm.}^{1\%}$ 189

When subjected to electrophoresis on paper the product behaved as though it had no net charge at pH 7.0 or pH 4.0.

On paper chromatography in butan-1-ol-ethanol-water (B.E.W.), the R$f$ value ($>$0.02) of the salt was lower than that of cephalosporin C (0.03). Similarly, in propan-l-ol-water (P.W.) it had lower R$f$ (0.11) as compared with cephalosporin C (0.22). Paper chromatography indicated that it yielded both $\alpha$-amino adipic caid and thirourea on acid hydrolysis.

All these properties suggested that the acetoxyl group in cephalosporin C has been replaced by a thiouronium moiety.

(b) *Acid hydrolysis of cephalosporin thiouronium salt.*—Cephalosporin thiouronium salt (50 mg.) was dissolved in hydrochloric acid (2 cc.) at various strengths (a) N/10 (b) 1N (c) 2N (d) 3N (e) 4N (f) 5N and allowed to stand at (i) room temperature cir. 25° C., (ii) 37° C. for several days. Aliquots (10 $\mu$l) were removed at suitable intervals. The reactions were investigated by paper chromatography and electrophoresis. In all cases the thiouronium compound (R$f$ 0.11) was converted into a faster moving material (R$f$ 0.20) which although very weakly biologically active, against both *S.*

*aureus* and *B. subtilis* was easily detected under U.V. light as a dark zone (as with all cephalosporin derivatives). Spraying the chromatograms with (a) aqueous pyridine followed by (b) acetone solution of phenylacetylchloride revealed this faster moving material (Rf 0.20) as a very biologically active material. Similar methods were used to detect this material after electrophoresis in which it moved faster towards the cathode at pH 4.0 than cephalosporin thiouronium salt.

By direct analogy with cephalosporin this material is 7-amino cephalosporanic thiouronium salt. From these preliminary experiments it appeared that suitable conditions for the production of 7-amino cephalosporanic thiouronium salt (i.e., thiouronium nucleus) were obtained when the thiouronium salt was treated with 2-3N hydrochloric acid for 3-4 days.

(c) *Separation of the thiouronium nucleus from acid hydrolysis of cephalosporin C thiouronium salt.*—The column and buffers were prepared according to the method of Hirs, Moore and Stein, J. Biol, Chem. 1952, 195, 669.

Cephalosporin C thiouronium salt (500 mg.) was dissolved in aqueous hydrochloric acid (2N; 20 cc.) and allowed to stand for three days. The pH of the solution was then adjusted to pH 4.0 with sodium hydrogen carbonate. The solution was assayed (biologically) at this point and showed that approx. 30% of the original biological activity was still present. This solution was passed through a column (2.5 x 30 cm.) of Dowex-50 ($NH_4$ cycle) and eluted with ammonium formate buffer (pH 4.05; 0.2 M). Fractions of 10 cc. were collected and assayed according to their ultra-violet absorption. 60 fractions were collected Nos. 8-28 being the peak fraction. Examination of this material after freeze drying showed that it contained unchanged cephalosporin C thiouronium salt together with other hydrolysis products. No thiouronium nucleus was present in any of these fractions.

Continued elution of the column with ammonium acetate buffer (pH 6.8; 0.2 M) displaced the nucleus as a broad peak (tube Nos. 70–90). This solution which contained the thiouronium nucleus (shown by paper chromatography and bioassay after spraying with pyridine and phenylacetyl chloride) was phenylacetylated using a larger excess of phenylacetyl chloride, the pH of the solution being maintained at pH 7 by the addition of sodium hydrogen carbonate. The resulting solution contained benzyl cephalosporin thiouronium salt as the only active material. Direct isolation of the nucleus was not possible in this case due to the inability to remove all the ammonium acetate buffer.

In Examples 6–19 the following experimental procedure was used.

Cephalosporin C Na salt (250 mg. 0.5 mill. mole) was dissolved in an aqueous solution (10 cc.) of the nucleophile (5 mill. mole) used. The pH of the solution was from 5.0–7.5, being adjusted (if necessary) to a value within this range by the addition of acetic acid. In certain cases where the solubility in water was low, e.g., diphenyl-thiourea, the reaction was carried out in 50% (v./v.) dimethylformamide (D.M.F.). The mixture was kept at 37° and after different intervals (e.g., 24, 48 and 72 hrs.) 5 or 10 $\mu$l samples were spotted onto paper for analysis by both electrophoresis and chromatography. Bioautographs revealed the new substitution product and remaining cephalosporin C. Similar results were obtained after spraying with ninhydrin.

Electrophoresis results are expressed as distance travelled by derivative relative to that travelled by parent cephalosporin compound under the same conditions. A positive (+) value implies migration towards the anode, that is the molecule is negatively charged whereas a negative (—) value indicates migration towards the cathode, i.e., the molecule is positively charged. For convenience the results of these examples are expressed in tabular form.

TABLE I

| Example | Nucleophile | Reaction Medium | R ceph. C Value | Electrophoresis | | Formula of derivatives (in all cases $R^2$=H $R^3$=HOOC.CH($NH_2$)($CH_2$)$_3$.CO) |
|---|---|---|---|---|---|---|
| | | | | pH 4.0 | pH 7.0 | |
| 2 | Thiourea | $H_2O$ | 0.53 | −0.19 | −0.26 | Formula III $R^4$, $R^5$, $R^6$ and $R^7$=H |
| 3 | Phenylthiourea | $H_2O$ Reaction effected at 50° C. | 1.39 | | | Formula III $R^4$=phenyl $R^5$, $R^6$, and $R^7$=H |
| 4 | Diphenylthiourea | D.M.F./$H_2O$ (70:30 v./v.) | ¹ 2.43 | | | Formula III $R^4$=phenyl $R^6$=phenyl $R^5$ and $R^7$=H |
| 5 | Ethylenethiourea | D.M.F./$H_2O$ (70:30 v./v.) | 0.64 | | | Formula III $R^4$ and $R^6$ together=ethylene $R^5$ and $R^7$=H |
| 6 | Thioacetamide | $H_2O$ | ¹ 1.41 | | | Formula IV $R^4$ and $R^5$=H $R^8$=methyl |
| 7 | Aniline | $H_2O$ | 1.86 | −0.12 | +0.69 | Formula VI $R^{10}$=H $R_2$=phenyl |
| 8 | N-methyl-aniline | EtOH/$H_2O$ (50:50 v./v.) | 2.17 | −0.17 | +0.65 | Formula VI $R^{10}$=methyl $R^9$=phenyl |
| 9 | p-Nitroaniline | D.M.F./$H_2O$ (70:30 v./v.) | 1.84 | +0.85 | +0.72 | Formula VI $R^{10}$=H 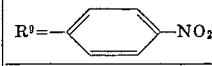 |
| 10 | Sodium p-amino benzoate | $H_2O$ | 0.52 | | | Formula VI $R^{10}$=H 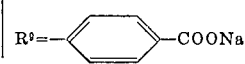 |

TABLE I.—Continued

| Example | Nucleophile | Reaction Medium | R ceph. C Value | Electrophoresis pH 4.0 | Electrophoresis pH 7.0 | Formula of derivatives (in all cases R²=H) R³=HOOC.CH(NH₂)(CH₂)₃.CO |
|---|---|---|---|---|---|---|
| 11 | Sodium sulphanilate | H₂O | 0.36 | | | Formula VI, $R^{10}=H$, $R^9=$ 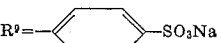—SO₃Na |
| 12 | α-Naphthylamine | D.M.F./H₂O (70:30 v./v.) | 2.19 | | | Formula VI, $R^{10}=H$, $R^9=$ 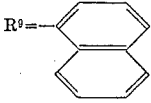 |
| 13 | Thiophenol | EtOH/H₂O (50:50 v./v.) | 2.17 | | | Formula V, $R^9=$phenyl |
| 14 | 2-aminoethanethiol | H₂O | 0.42 | +0.33 | +0.35 | Formula VII, $R^{11}=-C_2H_4-NH_2$ |
| 15 | Sodiumthiosulphate | H₂O | 0.32 | +1.86 | +2.29 | Formula IX, $R^{12}=S_2O_3$ Sodium salt |
| 16 | Sodium azide ion | H₂O | 1.14 | +1.02 | +1.04 | Formula VIII Sodium salt |
| 17 | Sodium phosphate | H₂O | 0.66 | | | Formula IX, $R^{12}=HPO_4$ Sodium hydrogen salt |
| 18 | Pyrrole | H₂O | 1.73 | | | Formula X |
| 19 | p-Nitro-N-methyl aniline | D.M.F./H₂O | 2.03 | | | Formula VI, $R^{10}=CH_3$, $R^9=$ 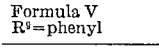—NO₂ |

¹ Reaction solution also contains additional biologically active compounds.

EXAMPLE 20

(a) Benzylcephalosporin (Na salt; 72 mg.) together with thiourea (128 mg.) were dissolved in distilled water (3 cc.) and allowed to stand in the absence of light at 37° C. for several days. After 3 days, the white precipitate which had formed was removed by centrifugation.

This material was washed with acetone and ether to give a white solid (28.9 mg.). A further quantity (approx. 5 mg.) of this material was obtained from the mother liquors. This solid gave a single biologically active spot on chromatography in the propanol:water system (7:3 by volume). Rƒ value 0.74. R Benzyl ceph. value=0.91.

Examination of the mother liquors by chromatography showed the presence of unchanged benzyl cephalosporin (Na salt) (Rƒ 0.81), thiourea (Rƒ 0.50) and small amounts of benzyl cephalosporin thiouronium salt (Rƒ 0.74). The benzyl cephalosporin thiouronium salt obtained in this way was very sparingly soluble in water («5 mg./cc.).

Paper electrophoresis showed that it possessed no net charge at pH 7.0. Ultra-violet spectrum (in H₂O)

λ max. 2600 A.$E^{1\%}_{1cm}$. 189

(b) Phenylacetylation of a mixture obtained according to Example 1(b) in aqueous acetone (50 v./v.) using a large excess of phenylacetyl chloride (i.e., conditions which had been used for the corresponding reaction with cephalosporin C nucleus) gave a solution containing benzylcephalosporin thiouronium salt (identified by its Rƒ value with an authentic sample) together with other biologically active material (e.g., cephalosporin C thiouronium salt and N-phenylacetyl cephalosporin C thiouronium salt). The overall yield of the conversion of cephalosporin C thiouronium salt to benzyl cephalosporin thiouronium salt is of the order of 4%.

Small-scale production of the members of the cephalosporin C family (Examples 21–34)

Cephalosporin C Na salt (250 mg.; 0.5 mill. mole) was dissolved in an aqueous acetone solution (50 v./v.; 10 cc.) of the nucleophile (1.5 mill. mole, i.e., 3 molar equivalents) employed. The pH of the solution was from 5.0–7.5, being adjusted (if necessary) to a value within this range by the addition of acetic acid or sodium bicarbonate. The mixture was kept at 37° or 50° C. and after different intervals (e.g., 24, 48 and 72 hours, etc.) 5 or 10 μl. samples were removed for analysis by both electrophoresis and chromatography. Bioautographs revealed the new substitution product and remaining cephalosporin C. Similar results were obtained after spraying with ninhydrin.

Small-scale production of the members of the "benzylcephalosporin C" family (Examples 35–54)

Due to the overall greater microbiological activity of the "benzylcephalosporin C" family, and for convenience in investigation solutions more dilute than those above were used, e.g., 7-phenylacetamidocephalosporanic acid ("benzylcephalosporin C") as the sodium salt (10 mg.) was dissolved in an aqueous acetone solution (50 v./v.; 2 cc.) of the nucleophile (3 molar equivalents). The reaction was carried out as in the previous example except that aliquots of approx. 1 μl. were used for chromatography and electrophoresis.

For convenience the results are expressed in a tabulated form in Tables II and III.

The acetone was then removed in vacuo and the residual aqueous suspension treated with water (10 cc.) and ex-

TABLE II.—NUCLEOPHILIC SUBSTITUTION OF CEPHALOSPORIN C

| Example | Nucleophile | R Ceph. C value | | Electrophoresis | |
|---|---|---|---|---|---|
| | | P.W. | B.E.W. | pH 4.0 | pH 7.0 |
| 21 | Ethylene thiourea | 0.63 | (¹) | −0.27 | −0.67 |
| 22 | 2-mercaptothiazoline | 1.55 | 4.11 | | |
| 23 | 2-mercaptohydantoin | 1.64 | 5.35 | −0.77 | −0.20 |
| 24 | 1-methyl-2-mercapto-imidazole | 0.75 | (¹) | −0.15 | +0.52 |
| 25 | 2-mercapto-imidazole | 0.79 | (¹) | −0.16 | +0.39 |
| 26 | 2-mercaptobenzimidazole | 2.0 | 4.6 | −0.39 | +0.22 |
| 27 | 2-mercaptobenzothiazole | 2.0 | 8.0 | +0.65 | +0.54 |
| 28 | 2-mercaptobenzoxazole | 1.9 | 8.0 | +0.79 | +0.50 |
| 29 | 2-aminothiophenol | 2.4 | 10.0 | +0.80 | +0.74 |
| 30 | 4-aminothiophenol | 2.25 | 10.0 | +0.04 | +0.53 |
| 31 | 4-nitrothiophenol | 1.75 | 8.0 | +0.93 | +0.69 |
| 32 | 2,4-dinitrothiophenol | 2.0 | 4.0 | +0.63 | +0.55 |
| 33 | 2-aminoethanethiol | 0.44 | 0.2 | +0.22 | +0.25 |
| 34 | 3-dimethylaminopropanethiol | 0.55 | 0.4 | −0.50 | −0.08 |

¹ Inseparable from Ceph. C.

TABLE III.—NUCLEOPHILIC SUBSTITUTION OF BENZYLCEPHALOSPORIN C

| Example | Nucleophile | R benzyl Ceph. C. value | | Electrophoresis | |
|---|---|---|---|---|---|
| | | B.E.W. | Et.Ac.¹ | pH 4.0 | pH 7.0 |
| 35 | Ethylene thiourea | (²) | 0.08 | −0.17 | 0.58 |
| 36 | 2-mercaptothiazoline | 1.15 | 3.06 | −0.20 | −1.20 |
| 37 | 2-mercaptohydantoin | 1.17 | 0.09 | −0.20 | −0.56 |
| 38 | 1-methyl-2-mercapto-imidazole | (²) | 0.41 | −0.14 | +0.31 |
| 39 | 2-mercapto-imidazole | 1.15 | 0.25 | −0.22 | −0.19 |
| 40 | 2-mercaptobenzimidazole | 1.25 | 1.9 | −0.17 | +0.18 |
| 41 | 2-mercaptobenzothiazole | 1.25 | 3.5 | +0.45 | +0.29 |
| 42 | 2-mercaptobenzoxazole | 1.25 | 3.3 | +0.66 | +0.48 |
| 43 | 2-aminothiophenol | 1.20 | 3.35 | +0.27 | +0.54 |
| 44 | 4-aminothiophenol | 1.25 | 3.4 | +0.0 | +0.0 |
| 45 | 4-nitrothiophenol | 1.20 | 3.35 | +0.65 | +0.73 |
| 46 | 2-aminoethanethiol | 0.80 | 0.05 | −0.27 | −0.25 |
| 47 | 3-dimethylaminopropanethiol | 0.75 | 0.05 | −0.27 | −0.25 |
| 48 | 2-mercapto-4-methyl-pyrimidine | 1.1 | 3.0 | +0.73 | +0.55 |
| 49 | 2-amino-5-mercapto-1,3,4-thiadiazole | 1 | 0.3 | +0.72 | +0.52 |
| 50 | 2-mercaptopyridine | 1.15 | 3.6 | | +0.3 |
| 51 | Ethyl thiourea | 1.0 | 0 | 0 | |
| 52 | Isopropyl thiourea | 1.0 | 0 | 0 | |
| 53 | Aniline | 1.23 | 3.12 | −0.12 | +0.68 |
| 54 | p-Nitroaniline | 1.25 | 2.46 | +0.04 | +0.44 |

¹ Et.-Ac.=ethyl acetate.
² Inseparable from benzyl Ceph. C.

EXAMPLE 55

*Preparation of the 2-mercaptobenzoxazole derivative of cephalosporin C*

Cephalosporin C (5 g.) in water (75 cc.) was added with stirring to a solution of 2-mercaptobenzoxazole (5 g.) in acetone (215 cc.) and water (60 cc.) and the apparent pH adjusted from 5 to 6.6 with N-sodium hydrogen carbonate. The mixture (ca 60 v./v. acetone) was kept at 37° for four days when paper chromatography revealed the presence of only a small amount of cephalosporin C. The reaction mixture was then diluted at 0° to 2 liters with acetone.

Filtration after 3 hours afforded an off-white solid (4 g.; yield, 80% w./w. cephalosporin C) which was shown by chromatography to contain a small amount (ca 5%) of cephalosporin C. The crude substitution product showed the chromatographic and electrophoretic properties listed in Table II (Example 28). It was very soluble in water.

EXAMPLE 56

*Preparation of the 2-mercaptobenzothioazole derivative of benzylcephalosporin C*

Benzylcephalosporin C sodium salt (435 mg.) in water (4 cc.) was added to a solution of 2-mercaptobenzothiazole (496 mg.) in acetone (6 cc.) and the apparent pH adjusted to 7.0 with N-sodium hydrogen carbonate. The mixture was kept at 50° for 65 hours when essentially all the starting material had reacted (paper chromatography).

tracted with ethyl acetate at pH 6 in the presence of saturated sodium chloride (5 cc.). An off-white solid (A) separated during the extraction. The residual aqueous solution from this extraction was adjusted to pH 2 and further extracted with ethyl acetate. The pH 6 extract (486 mg.) contained unchanged nucleophile and the desired substitution product. The pH 2 extract (65 mg.) contained traces of unchanged benzylcephalosporin C.

The solid (A) (insoluble in acetone; 136 mg.) was the desired substitution product with the chromatographic and electrophoretic properties listed in Table III (Example 41) and was chromatographically homogeneous.

EXAMPLE 57

*Preparation of the 1-methyl-2-mercapto-imidazole derivative of benzylcephalosporin C*

Benzylcephalosporin C (Na salt; 100 mg.) was dissolved in water (1 cc.) and treated with a solution of 1-methyl-2-mercaptoimidazole (85 mg.; 3 molar equivalents) in acetone (1 cc.). The resulting solution was allowed to stand at 37° for several days; the reaction being followed by paper chromatography. After four days the excess of the nucleophile was removed from the reaction mixture by extraction with chloroform (2 x 1 cc.) and the pH of the residual aqueous solution adjusted to circa 2.5 with either phosphoric acid or Amberlite IR. 120 (H+). Extraction with ethyl acetate (3 x 2 cc.) removed the remaining unchanged benzylcephalosporin C.

The residual aqueous solution, containing the new substitution product, was adjusted to pH 7 with sodium hydrogen carbonate or Deacidite G($CO_3''$) and freeze dried.

Examination by paper chromatography and electrophoresis showed only one biologically active material, i.e., benzylcephalosporin thio-imidazolinium salt, although varying amounts of inorganic salts were present depending on whether ion-exchange resins were used for the adjustment of pH. Benzylcephalosporin thio-imidazolinium salt was active against both *S. aureus* and *V. cholerae*.

EXAMPLE 58

(a) *Preparation of phenoxymethyl cephalosporin.*—500 mgm. of 7-aminocephalosporanic acid (7ACA)

($E_{1cm.}^{1\%}$=260 $\lambda_{max.}$=300 m$\mu$)

dissolved in 25 mls. of 3% $NaHCO_3$ (5 mol. equiv.) and 16 mls. of acetone. The solution was chilled to below 5° C. and magnetically stirred while 376 mg. of phenoxyacetyl chloride dissolved in 10 mls. of acetone were added dropwise over 30 mins. The solution was allowed to warm up to room temperature over 1 hour. The acetone was removed under vacuo and the aqueous layer extracted with 2 x 25 ml. ether. After adjustment of the pH to 4.0 with 3N $H_2SO_4$ excess phenoxyacetic acid was extracted with 1 x 50 ml. benzene. Finally the pH of the aqueous layer was adjusted to 2.0 and then extracted with 3 x 50 mls. ethyl acetate. These extracts were bulked, dried over $Na_2SO_4$ (10 minutes) and reduced in volume under vacuum to yield 724 mg. of an oil. This was taken up in the minimum volume of acetone (about 3 mls.) and 326 mg. of sodium 2-ethyl hexoate (1.1 mol. equiv.) in aqueous acetone was added. The solution was chilled for 1.5 hr. and the product separated by filtration, washed with dry acetone and dried.

Yield: 470 mg.

(1) *U.V.—*

$\lambda_{min.}$=235 $E_{1cm.}^{1\%}$=126 $\lambda_{max.}$=263. $E_{1cm.}^{1\%}$=190

(2) *Chromatography.*—Propanol/water (7:3) $R_F$ 0.73; ethyl acetate/pH 5 buffer $R_F$ 0.33.

(3) *Electrophoresis.*—At pH 4.0 and 7.0, $R_{ceph. \ c}$=1.0.

(b) *Preparation of phenoxymethyl cephalosporin thiouronium compound.*—200 mg. of phenoxymethyl cephalosporin (Na salt) and 240 mg. of thiourea were dissolved in 2 mls. of $H_2O$ and kept in the dark at 37° C. for 3 days. On chilling the solution to 0° C. a precipitate was obtained which was filtered at 0° C. and washed with a little ice-cold water. The solid was dried in a vacuum desiccator overnight to yield 67.2 mg. of solid.

(1) *U.V.*—Shoulder at 258–265 m$\mu$, $\lambda$ max. 237 m$\mu$, $\lambda$ min. 230 m$\mu$.

(2) *Chromatography.*—Propanol/$H_2O$ 0.665; ethyl acetate buffer 0.

(3) *Electrophoresis.*—No movement at pH 4.0 and 7.0.

EXAMPLE 59

(a) *Preparation of* n-*heptylcephalosporin.*—500 mg. of 7ACA were dissolved in 25 mls. 3% $NaHCO_3$ and 16 mls. of acetone. The solution was chilled to below 5° C. and 0.73 mls. (2.5 mol. equiv.) of caprylyl chloride in 10 mls. dry acetone added dropwise over 30 mins. The solution was then allowed to warm up to room temperature over 1 hour, acetone was removed under vacuo and the residual solution extracted with 2 x 25 ml. ether. The pH was adjusted to pH 3 prior to benzene extraction (1 x 50 ml.) and then further adjusted to 2.0 before extraction with ethyl acetate (3 x 50 ml.). Ethyl acetate layers were then bulked, dried over $Na_2SO_4$ and reduced in volume under vacuum to yield 391 mg. of a crystalline solid. This was dissolved in a little acetone and 170 mg. (1.1 mol. equiv.) sodium-2-ethyl hexoate in aqueous acetone added. The solution was refrigerated for 1 hr. and the product collected by filtration, washed with dry acetone and dried.

Yield: 298 mg.

(1) *U.V.*—$\lambda$ min. 220, $\lambda$ max. 263.
(2) *Chromatography.* — Butanol/EtOH/$H_2O$ $R_F$ 0.75; propanol/$H_2O$ $R_F$ 0.84; ethylacetate/buffer R 0.70.
(3) *Electrophoresis.*—pH 7.0 $R_{ceph. \ c}$=1.0 pH 4.0 $R_{ceph. \ c}$=1.04.

(b) *Preparation of* n-*heptyl cephalosporin thiouronium compound.*—150 mg. of n-heptyl cephalosporin (Na salt) and 70 mg. of thiourea were incubated in 5 ml. $H_2O$ in the dark at 37° C. for 3 days. This solution had solidified completely at the end of this time and was triturated with $H_2O$ and the jelly-like material filtered off, washed with $H_2O$ and dried in a vacuum desiccator to give 124 mg. of amorphous powder.

(1) *U.V.*—Shoulder 258–265 m$\mu$, but sample not pure.
(2) *Chromatography.*—Propanol/$H_2O$ $R_F$=0.770; ethyl acetate/buffer $R_F$=0.102.
(3) *Electrophoresis.*—At pH 4.0 and 7.0, no movement.

In like manner various other acyl derivatives were prepared of cephalosporin thiouronium derivative. For convenience the results obtained are shown in tabular form in Tables IV and IVa.

TABLE IV

| Example | Acyl group | R Benzyl Ceph. | | Electrophoresis | |
|---|---|---|---|---|---|
| | | B.E.W. | Et. Ac. | pH 4.0 | pH 7.0 |
| 60 | S-phenyl thioacetyl $C_6H_5$—S—$CH_2CO$— | 0.88 | 0.16 | | |
| 61 | S-benzyl thioacetyl $C_6H_5$—$CH_2$—S.$CH_2CO$— | 0.92 | 0.29 | −0.11 | −0.14 |
| 62 | Benzoyl | 1 0.80 | 0.09 | | |
| 63 | 2,6-dimethoxybenzoyl | 1 0.88 | | −0.17 | |

[1] Propanol-water solvent system.

TABLE IVa

| Example | Acyl group | U.V. Data | |
|---|---|---|---|
| | | $\lambda_{max.}$ (m$\mu$) | $E_{1 cm.}^{1\%}$ |
| 64 | p-Bromophenylthioacetyl | 256–257 | [1] 290 |
| 65 | p-Tert-.butylphenylthioacetyl p-($CH_3$.$C_6H_4$.S.$CH_2CO$— | [2] 245 | 380 |
| 66 | β-Benzylthiopropionyl $C_6H_5CH_2$.S.$CH_2$.$CH_2$.CO— | 261–262 | 200 |
| 67 | Phenethylthioacetyl $C_6H_5CH_2$.$CH_2$.S.$CH_2$.CO— | 260 | 163 |
| 68 | n-Butylthioacetyl | 260 | 207 |
| 69 | Propargylthioacetyl CH≡C.$CH_2$.S.$CH_2$.CO— | 260 | 208 |
| 70 | p-Chlorophenylthioacetyl | 254–256 | 326 |

[1] Not fully solvent.
[2] Plateau.

EXAMPLES 71–79

*Preparation of 7-allylthioacetamidocephalosporanic acid sodium salt*

7-aminocephalosporanic acid (1.9 g., 7 m. mole) was suspended in ethyl acetate (100 ml.), and treated with allylthioacetyl chloride (2 g., 13.3 m. mole). After heating under reflux for 1.25 hrs., the solution was filtered from a small amount of insoluble material, and the filtrate taken to dryness in vacuo. The residual gum was dissolved in a mixture of acetone (20 ml.) and ether (20 ml.), filtered, and treated with a 10% solution of sodium ethylhexanoate in n-butanol (15 ml.) followed by ether (150 ml.). The resultant cream precipitate was filtered off and dried (2.34 g.). Crystallisation from aqueous acetone gave the product as a white crystalline solid (1.13 g.), $\lambda_{max.}$ (phosphate buffer at pH 6) 260 m$\mu$ ($\epsilon$ 9,080). A further crystallisation gave material, $\lambda_{max.}$ (as above) 260 m$\mu$ ($\epsilon$ 9,300), $[\alpha]_D$ +117° (c., 0.87; H$_2$O).

The method has also been applied successfully to acylation of 7-aminocephalosporanic acid with cyclopentanoyl chloride, p-bromophenylthioacetyl chloride, n-butanoyl chloride, p-nitrophenylacetyl chloride, n-butanecarboxy chloride, n-pentanecarboxy chloride, trans cinnamoyl chloride and β-phenylpropionyl chloride.

The resulting sodium salts were then reacted in turn with thiourea using the general method described above. The thiouronium salts obtained had the following characteristics:

TABLE V

| Ex. | Acyl group | U.V. Data | | |
|---|---|---|---|---|
| | | H$_2$O $\lambda_{max.}$ (m$\mu$) | $E^{1\%}_{1\ cm.}$ | $\epsilon$ |
| 71 | Cyclopentanoyl | 262.5 | 224 | 9,000 |
| 72 | p-Bromophenylthioacetyl | 258 | 283 | |
| 73 | n-Butanoyl | 263 | 207 | |
| 74 | Allylthioacetyl | 261 | 208 | 8,730 |
| 75 | p-Nitrophenylacetyl | 270 | 376 | 17,000 |
| 76 | n-Butanecarboxy | 263 | 233 | |
| 77 | n-Pentanecarboxy | 263 | 240 | |
| 78 | Trans. cinnamoyl C$_6$H$_5$.CH=CH.CO— | 278 | 862 | |
| 79 | β-Phenylpropionyl | 259–262 | 224 | |

In a similar manner the azides of n-pentane-carboxamidocephalosporanic acid, benzylthioacetylamidocephalosporanic acid and 7-p-chlorophenylthioacetamidocephalosporanic acid were prepared and gave the following U.V. data.

TABLE VI

| Example | Acyl groups | U.V. Data | |
|---|---|---|---|
| | | $\lambda_{max.}$ (m$\mu$) | $E^{1\%}_{1\ cm.}$ |
| 80 | n-Pentanecarboxy | 262 | 242 |
| 81 | Benzylthioacetyl | 260 | 216 |
| 82 | p-Chlorophenylthioacetyl | 255–262 | 332 |

The elemental analyses of some compounds prepared in the above examples are given in Table VII:

TABLE VII

| Example | Formula | Found | | | | | | Required | | | | | |
|---|---|---|---|---|---|---|---|---|---|---|---|---|---|
| | | C | H | Br | Cl | N | S | C | H | Br | Cl | N | S |
| 60 | C$_{17}$H$_{18}$N$_4$O$_4$S$_3$.H$_2$O | 44.3 | 4.3 | | | 12.3 | 21.8 | 44.7 | 4.4 | | | 12.3 | 21.07 |
| 61 | C$_{18}$H$_{20}$N$_4$O$_4$S$_2$.H$_2$O | 45.5 | 4.7 | | | 12.2 | 20.9 | 45.9 | 4.7 | | | 11.9 | 20.4 |
| 70 | C$_{17}$H$_{21}$ClN$_4$O$_6$S$_3$.2H$_2$O | 39.8 | 4.09 | | 6.5 | 10.8 | 19.4 | 40.1 | 4.2 | | 7.0 | 11.0 | 18.9 |
| 71 | C$_{15}$H$_{20}$N$_4$O$_4$S$_2$.H$_2$O | 44.1 | 5.5 | | | 14.2 | 16.1 | 44.8 | 5.5 | | | 13.9 | 15.9 |
| 72 | C$_{17}$H$_{17}$Br.N$_4$O$_4$S$_3$ | 39.0 | 3.6 | 15.6 | | 10.9 | 18.5 | 39.5 | 3.4 | 15.4 | | 10.8 | 18.6 |
| 74 | C$_{14}$H$_{20}$N$_4$O$_5$S$_3$.H$_2$O | 40.4 | 4.9 | | | 13.2 | 23.1 | 40.0 | 4.8 | | | 13.3 | 22.9 |
| 77 | C$_{15}$H$_{20}$N$_4$O$_4$S$_2$.½H$_2$O | 45.8 | 5.9 | | | 13.8 | 15.1 | 45.6 | 5.9 | | | 14.2 | 16.2 |
| 79 | C$_{18}$H$_{20}$N$_4$O$_4$S$_2$.H$_2$O | 49.4 | 5.5 | | | 12.7 | 14.4 | 49.3 | 5.1 | | | 12.8 | 14.6 |
| 66 | C$_{19}$H$_{22}$N$_4$O$_4$S$_2$.½H$_2$O | 48.0 | 5.0 | | | 11.8 | 20.7 | 48.0 | 4.9 | | | 11.8 | 20.23 |
| 69 | C$_{14}$H$_{16}$N$_4$O$_4$S$_3$.H$_2$O | 39.9 | 4.4 | | | 13.1 | 22.9 | 40.2 | 4.3 | | | 13.4 | 23.0 |
| 81 | C$_{17}$H$_{17}$N$_5$O$_4$S$_2$.½H$_2$O | 48.0 | 4.3 | | | 16.4 | 15.0 | 47.6 | 4.2 | | | 16.4 | 15.0 |

The activity of various compounds prepared in the above examples against different strains of *S. aureus* was ascertained by tube dilution assays and compared with related cephalosporin compounds. The results are given in Tables VIII, IX and X.

TABLE VIII

| Compound Tested | Minimum Inhibitory Concn. ($\gamma$/ml.) | |
|---|---|---|
| | *S. aureus* C864 Oxford Strain | *S. aureus* 663 |
| Cephalosporin C | 62 | 62 |
| Cephalosporin C thiouronium salt | 8 | |
| Product of Example 21 | 20 | |
| Product of Example 26 | | 62 |
| Product of Example 27 | | 0.5 |
| Product of Example 28 | | 31 |
| Product of Example 29 | | 62 |
| Product of Example 30 | | 31 |

TABLE IX

| Compound Tested | Minimum Inhibitory Concn. ($\gamma$/ml.) | |
|---|---|---|
| | *S. aureus* C864 Oxford Strain | *S. aureus* 663 |
| Benzyl cephalosporin | 0.16 | 0.16 |
| Benzylcephalosporin thiouronium salt | 0.06 | 0.06 |
| Product of Example 40 | 0.08 | 0.04 |
| Product of Example 41 | | 0.01 |
| Product of Example 42 | 0.04 | 0.04 |
| Product of Example 51 | | 0.02 |
| Product of Example 52 | | 0.01 |
| Product of Example 53 | 0.01 | 0.01 |
| Product of Example 54 | 0.02 | 0.04 |

TABLE X

| Compound Tested | Minimum Inhibitory Concn. (γ/ml.) | |
|---|---|---|
| | S. aureus C864 Oxford Strain | S. aureus 604 |
| Product of Example 60 | 0.01 | 0.08 |
| Product of Example 61 | 0.02 | 0.04 |
| Product of Example 71 | 31 | 2.5 |
| Product of Example 72 | <0.01 | 0.31 |
| Product of Example 73 | 0.08 | 0.31 |
| Product of Example 74 | 0.04 | 0.15 |
| Product of Example 75 | 0.01 | 0.15 |
| Product of Example 76 | 0.16 | 0.62 |
| Product of Example 77 | 0.04 | 0.16 |
| Product of Example 78 | 0.5 | 2.0 |
| Product of Example 79 | 0.08 | 0.16 |
| Product of Example 65 | 0.05 | 0.62 |
| Product of Example 66 | 0.01 | 0.16 |
| Product of Example 67 | 0.08 | 0.62 |
| Product of Example 68 | 0.02 | 0.16 |
| Product of Example 69 | 0.04 | 0.08 |
| Product of Example 70 | 0.02 | 0.08 |
| Product of Example 80 | 0.16 | 0.31 |
| Product of Example 81 | 0.04 | 0.08 |
| Product of Example 82 | 0.04 | 0.16 |
| Product of Example 20 | 0.06 | 0.30 |
| Product of Example 50 | 0.04 | 0.31 |
| Product of Example 51 | 0.31 | 2.5 |
| Product of Example 42 | 0.04 | 0.31 |

EXAMPLE 82

*Preparation of intramuscular injection*

(a) *Preparation of sterile phenylacetyl cephalosporin thiouronium salt.*—Sterile apparatus was used and aseptic conditions were employed throughout.

A 6 percent solution of thiourea in sterile, pyrogen-free water was prepared and also a 10 percent solution of the sodium salt of phenylacetamido cephalosporanic acid in sterile, pyrogen-free water. Sterile nitrogen was bubbled through each of the solutions to remove any carbon dioxide and the solutions were separately sterilised, by filtration through a 5/3 sintered glass filter. The sterile solutions were admixed. Air in the container was displaced with nitrogen and the container was sealed. The container was then slowly rotated and maintained at 37° C. for 65 hours. The resulting precipitate was separated by filtration under reduced pressure.

The precipitate was washed with sterile, pyrogen-free water to remove excess thiourea by repeated dispersion in the water until U.V. spectroscopic examination of the precipitate indicated a thiourea content not exceeding 1.5 percent.

The precipitate was dried to constant weight in a desiccator under reduced pressure at ambient temperature. The resulting dried cake was ground to a fine powder in a sterile glass mortar. The resulting sterile powder of phenylacetyl cephalosporin thiouronium salt (P.A.T.) was then used to prepare intramuscular injections having the following composition:

P.A.T., g. _____ 0.1
Urea (sterile powder), g. _____ 1.0
Sterile, pyrogen-free water (for reconstitution), ml. __ 1.2

(b) *Preparation of sterile urea.*—A 20 percent solution of urea in sterile, pyrogen-free water was prepared, sterilised by filtration through a 5/3 sintered glass filter and the resulting solution freeze-dried. The freeze-dried cake was reduced to a fine powder by grinding in a sterile glass mortar.

(c) *Preparation of injection.*—The required quantities of sterile P.A.T. and sterile urea were weighed, uniformly mixed and distributed into sterile 5 ml. vials so that each vial contained 1.1 g. of the mixture. The vials were sealed hermetically to exclude bacteria.

Immediately before the vials are required for use, 1.2 ml. of sterile pyrogen-free water is injected through the vial closure and the vial shaken. In this way 2 mls. of a solution of P.A.T. in urea suitable for intramuscular use is obtained.

EXAMPLE 83

*Oral Tablet*

| | Mg. |
|---|---|
| P.A.T. (fine particle) | 100 |
| Maize starch | 20 |
| Lactose | 74 |
| Polyvinylpyrrolidone | 4 |
| Magnesium stearate | 2 |

The starch, lactose and P.A.T. is passed through a 60-mesh sieve, dry blended and granulated with a solution of polyvinylpyrrolidone in chloroform. The mass is screened through a 12 mesh sieve and the resulting granules dried at 40° C. to completely remove the chloroform. The dried granules are passed through a 16-mesh screen. The magnesium stearate is mixed with the separated "fines" and the mixture blended with the granules.

Tablets are manufactured by compression at 200 mg. on 5/16" punches. The tablets may also be film coated or sugar coated if required.

We claim:

1. A compound selected from the group consisting of compounds of the formula

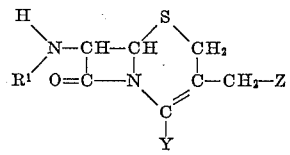

where $R^1$ is selected from the group consisting of
 (a) hydrogen
 (b) triphenyl methyl-
 (c) lower aralkenoyl
 (d) propargyl thio acetyl
 (e) $R^2$—$(CH_2)_nCO$— where $R^2$ is cycloalkyl, phenyl, nitrophenyl, chlorophenyl, bromophenyl, lower alkoxy phenyl or lower alkyl phenyl and $n$ is an integer from 1 to 4
 (f) $R^3CO$— where $R^3$ contains from 2–7 carbon atoms and is alkyl, alkylthioalkyl, alkoxyalkyl or amino-, carboxy-alkyl
 (g) $R^4CO$— where $R^4$ contains from 2–7 carbon atoms and is alkenyl, alkylthioalkenyl, alkenylthioalkyl, alkoxyalkenyl or alkenyloxyalkyl
 (h) $R^2X(CH_2)_nCO$— where $R^2$ and $n$ are as defined above and X is oxygen or sulphur
 (i) $R^2(CH_2)_nS(CH_2)_mCH_2CO$— where $R^2$ and $n$ are as defined above and $m$ is 0 or an integer from 1 to 4 and
 (j) $R^2CO$— where $R^2$ is as defined above and Z is selected from the group consisting of (k)

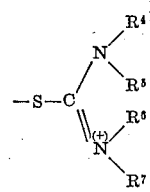

in which $R^4$, $R^5$, $R^6$ and $R^7$ are selected from the group consisting of hydrogen, alkyl of 2 to 3 carbon atoms, phenyl and ethylene represented by $R^4$ and $R^6$ taken together, (l)

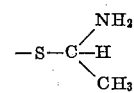

(m)

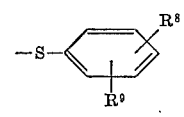

in which $R^8$ and $R^9$ are selected from the group consisting of amino and nitro, (n) 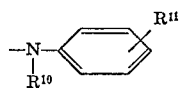

in which $R^{10}$ is selected from the group consisting of hydrogen and methyl and $R^{11}$ is selected from the group consisting of nitro, carboxyl and —$SO_3H$, (o) 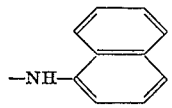

(p) 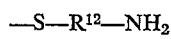

in which $R^{12}$ is alkylene of 2 to 5 carbon atoms, (q) —$N_3$, —$S_2O_3H$, —$HPO_4H$ (r) 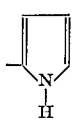

(s) 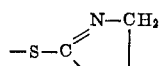 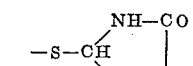

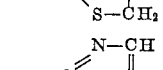 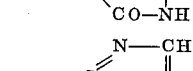

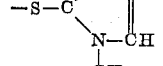 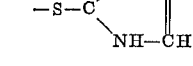

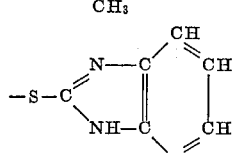 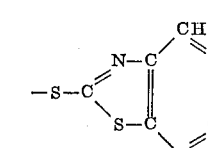

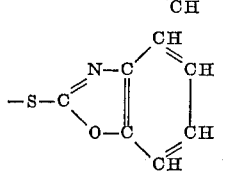 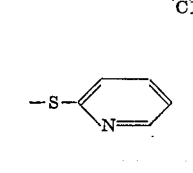

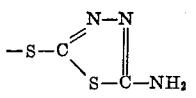 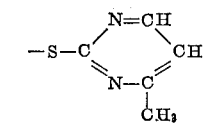

and Y is selected from the group consisting of —COOH, —COOM where M is an alkali metal and where Z is (k) Y is —$COO^{(-)}$.

2. A compound selected from the group consisting of compounds of the formula

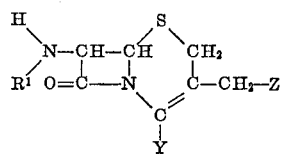

in which $R^1$ is selected from the group consisting of:
(a) hydrogen,
(b) triphenyl methyl, (c) alkanoyl, S-alkylthio alkanoyl and alkoxyalkanoyl of 3 to 8 carbon atoms,
(d) alkenoyl, S-alkenylthio alkanoyl and alkenoxy-alkanoyl of 3 to 8 carbon atoms,
(e) $R^2(CH_2)_nCO$— in which $n$ is an integer from 1 to 4 and $R^2$ is selected from the group consisting of phenyl and nitrophenyl,
(f) phenoxyacetyl,
(g) S-phenylthioacetyl, S-chloro-phenylthioacetyl, S-bromo-phenylthioacetyl and S-tertiarybutyl-phenyl-thioacetyl,
(h) $R^2(CH_2)_mS(CH_2)_nCO$— in which $m$ is an integer from 1 to 4 and $n$ and $R^2$ have the above given meanings,
(i) $R^3CO$— in which $R^3$ is selected from the group consisting of phenyl, cyclopentyl and dimethoxyphenyl,
(j) 5-amino-5-carboxylvaleryl
(k) propargylthioacetyl and (1) cinnamoyl and Z is selected from the group consisting of:

(a) 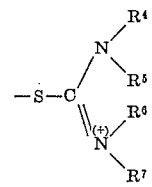

in which $R^4$, $R^5$, $R^6$ and $R^7$ are selected from the group consisting of hydrogen, alkyl of 2 to 3 carbon atoms, phenyl and ethylene represented by $R^4$ and $R^6$ taken together, (b) 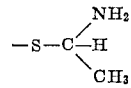

(c) 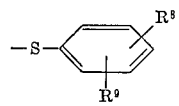

in which $R^8$ and $R^9$ are selected from the group consisting of amino and nitro, (d) 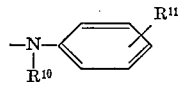

in which $R^{10}$ is selected from the group consisting of hydrogen and methyl and $R^{11}$ is selected from the group consisting of nitro, carboxyl and $SO_3H$, (e) 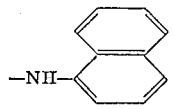

(f) 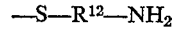

in which $R^{12}$ is alkylene of 2 to 5 carbon atoms,
(g) —$N_3$,—$S_2O_3H$,—$HPO_4H$
(h)

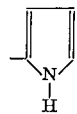

(i)

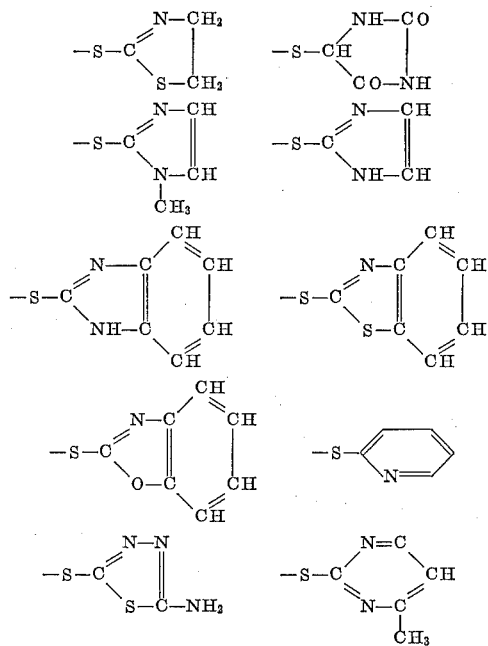

and Y is selected from the group consisting of —COOH, —COOM where M is an alkali metal and when Z is (a) Y is —COO$^{(-)}$.

3. A process for the preparation of derivatives of cephalosporin C comprising reacting in a polar medium at a pH of from 5 to 8, a compound selected from the group consisting of compounds of the formula

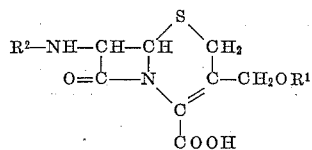

and alkali metal salts thereof, in which $R^1$ is lower alkanoyl and $R^2$ is selected from the group consisting of hydrogen, acyl, and triarylalkyl with at least one molar equivalent of a strong nucleophile selected from the group consisting of:

(a) thioureas of the formula

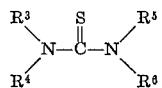

in which $R^3$, $R^4$, $R^5$ and $R^6$ are selected from the group consisting of hydrogen, alkyl, cycloalkyl, alkenyl, aryl, aralkyl and alkylene represented by $R^4$ and $R^6$ taken together, (b) thioamides of the formula

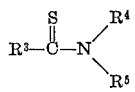

in which $R^3$, $R^4$ and $R^5$ have the above given meanings, (c) thiophenols of the formula

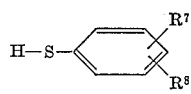

in which $R^7$ and $R^8$ are selected from the group consisting of hydrogen, amino, alkylamino, dialkylamino, nitro, nitroso, carboxyl, cyano and trifluoromethyl, (d) aromatic amines of the formula

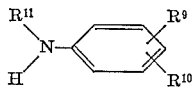

in which $R^9$ and $R^{10}$ are selected from the group consisting of hydrogen, amino, alkylamino, dialkylamino, nitro, nitroso, carboxyl, cyano, trifluoromethyl and $SO_3H$, and $R^{11}$ is selected from the group consisting of hydrogen and alkyl, (e) thiols of the formula $$H-S-R^{12}$$

in which $R^{12}$ is selected from the group consisting of aminoalkyl containing 2 to 5 carbon atoms, 2-thiazolinyl, 2-hydantoinyl, 2-imidazolyl, 2-benzimidazolyl, 2-benzothiazolyl, 2-benzoxazolyl, 2-pyridinyl, 5-thiadiazolyl, 2-pyrimidinyl, 2-piperidinyl and amino and alkyl nuclear derivatives of the heterocyclic radicals, (f) alkali metal salts selected from the group consisting of azides, hydrogen phosphates and thiosulfates and (g) pyrroles and alkyl pyrroles.

4. A process as defined in claim 3 in which said polar medium is water.

5. 7-phenylacetamidocephalosporin thiouronium salt of the formula

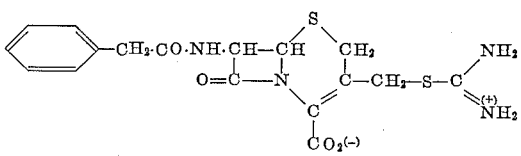

6. 7-benzylthioacetamidocephalosporin thiouronium salt of the formula

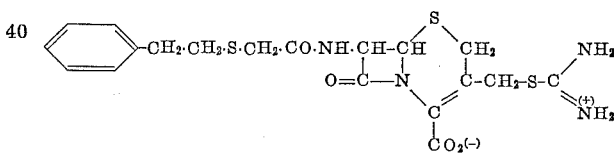

7. 7-allylthioacetamidocephalosporin thiouronium salt of the formula

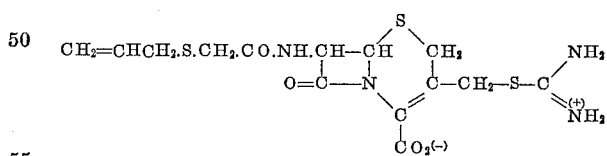

8. 7-β-benzylthiopropionamidocephalosporin thiouronium salt of the formula

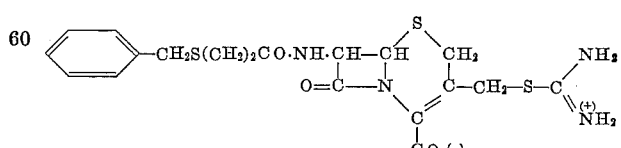

9. 7-β-phenylpropionamidocephalosporin thiouronium salt of the formula

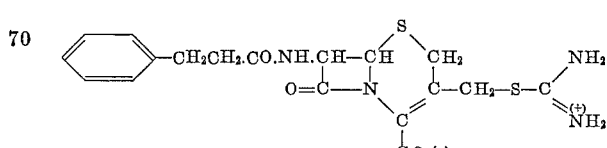

10. 7-pentanecarboxamidocephalosporin thiouronium salt of the formula

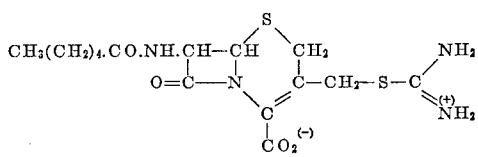

11. 7-n-butylthioacetamidocephalosporin thiouronium salt of the formula

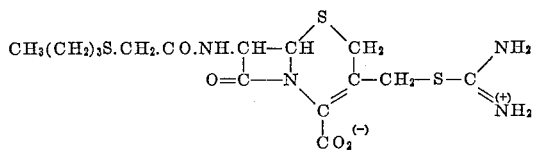

12. 7-p-chlorophenylthioacetamidocephalosporin thiouronium salt of the formula

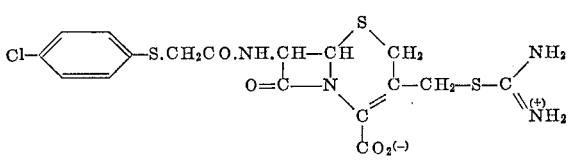

13. 7-β-phenethylthioacetamidocephalosporin thiouronium salt of the formula

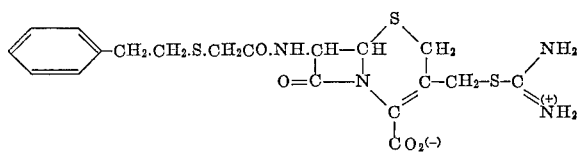

14. 7-phenylacetamidocephalosporin azide of the formula

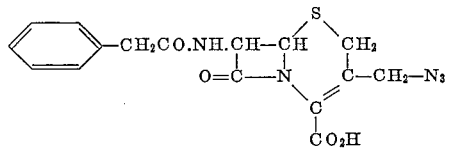

15. 7-benzylthioacetamidocephalosporin azide of the formula

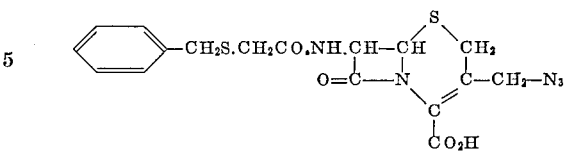

16. 7-phenylacetamidocephalosporin-mercapto pyridine derivative of the formula

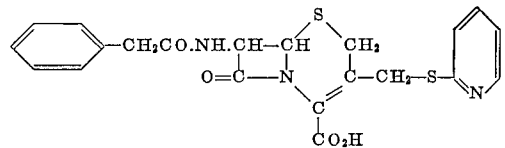

17. 7-phenylacetamidocephalosporin N-ethyl thiouronium salt of the formula

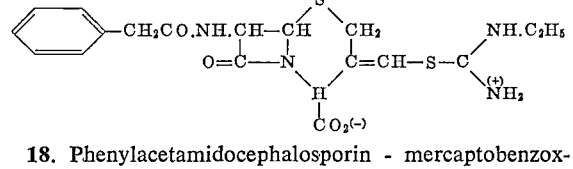

18. Phenylacetamidocephalosporin - mercaptobenzoxazole derivative of the formula

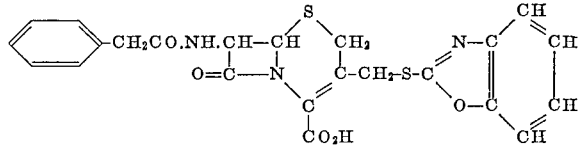

References Cited by the Examiner
UNITED STATES PATENTS
3,124,576  3/1964  Stedman _____ 260—243
3,173,916  3/1965  Schull et al. _____ 260—243

ALEX MAZEL, *Primary Examiner.*
NICHOLAS S. RIZZO, *Examiner.*
JAMES W. ADAMS, JR., *Assistant Examiner.*